United States Patent
Ryu et al.

(10) Patent No.: US 10,938,012 B2
(45) Date of Patent: Mar. 2, 2021

(54) BATTERY MODULE

(71) Applicant: LG Chem, Ltd., Seoul (KR)

(72) Inventors: Jae-Uk Ryu, Daejeon (KR); Ji-Su Yoon, Daejeon (KR); Dal-Mo Kang, Daejeon (KR); Jeong-O Mun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 375 days.

(21) Appl. No.: 15/901,298

(22) Filed: Feb. 21, 2018

(65) Prior Publication Data
US 2018/0248166 A1 Aug. 30, 2018

(30) Foreign Application Priority Data
Feb. 24, 2017 (KR) .................. 10-2017-0024649

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC . H01M 2/206; H01M 2/1077; H01M 2220/20
See application file for complete search history.

(56) References Cited

U.S. PATENT DOCUMENTS

| | | |
|---|---|---|
| 2006/0214631 A1 | 9/2006 | Yoon et al. |
| 2006/0267545 A1 | 11/2006 | Lee et al. |
| 2012/0009447 A1* | 1/2012 | Ikeda ................. H01M 2/1077 429/90 |
| 2015/0214532 A1* | 7/2015 | Nakayama .......... H01M 2/1077 429/50 |
| 2016/0134000 A1* | 5/2016 | Lee .................... H01M 2/1077 429/120 |
| 2017/0025660 A1* | 1/2017 | Shin ...................... H01M 2/206 |

FOREIGN PATENT DOCUMENTS

| | | |
|---|---|---|
| JP | 4565968 B2 | 10/2010 |
| KR | 10-2006-0116424 A | 11/2006 |
| KR | 10-0891079 B1 | 3/2009 |
| KR | 10-2009-0043717 A | 5/2009 |
| KR | 10-1449307 B | 10/2014 |
| KR | 10-2016-0139807 A | 12/2016 |
| WO | 2009/057893 A1 | 5/2009 |
| WO | WO-2015016564 A1 * | 2/2015 ........ H01M 10/6556 |

* cited by examiner

*Primary Examiner* — Matthew T Martin
(74) *Attorney, Agent, or Firm* — Morgan, Lewis & Bockius LLP

(57) ABSTRACT

A battery module comprising a first battery group having at least one secondary battery; a second battery group having at least one secondary battery that does not belong to the first battery group; a first bus bar to which an electrode lead of the secondary battery belonging to the first battery group is contacted and coupled; a second bus bar spaced apart from the first bus bar so that an electrode lead of the secondary battery belonging to the second battery group is contacted and coupled thereto; a sub bus bar interposed between the first bus bar and the second bus bar to electrically connect the first bus bar and the second bus bar; and an elastic member having a portion coupled and fixed to the sub bus bar to give a restoring force for separating the sub bus bar from the first bus bar and the second bus bar.

15 Claims, 7 Drawing Sheets

BATTERY MODULE

TECHNICAL FIELD

The present application claims priority to Korean Patent Application No. 10-2017-0024649 filed on Feb. 24, 2017 in the Republic of Korea, the disclosures of which are incorporated herein by reference.

The present disclosure relates to a battery including a plurality of secondary batteries, and more particularly, to a battery module with improved safety due to an improved bus bar assembly structure and a battery pack including the battery module.

BACKGROUND ART

Recently, as the demand for portable electronic products such as cameras and portable telephones has increased sharply and the use and development of energy storage batteries, vehicles, robots, satellites, and so on have expanded, a battery pack used therein becomes highly highlighted and actively studied.

A battery pack generally contains at least one secondary battery that is also called a cell. In addition, secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

As the battery pack is applied more broadly, the safety of the battery pack is becoming an important issue. Further, in recent years, electric vehicles such as EV, HEV, and PHEV, which are supplied with a driving power from a battery pack, are being commercialized in earnest. The battery pack used in the electric vehicle is a middle-sized or large-sized battery pack includes a much larger number of secondary batteries connected in series and/or parallel, compared to a small battery pack used in a portable electronic device or the like. In addition, the middle-sized or large-sized battery pack may have very high charge/discharge voltage and current.

In this situation, if the battery pack is overcharged, the battery pack may be damaged. Since the battery pack used for an electric vehicle demands a high output, if an overcharge occurs for some secondary batteries, the battery pack may not give a proper output and thus the battery pack may not be able to smoothly operate the electric vehicle. In addition, in a severe case, overcharge of the battery pack may cause a dangerous situation where the battery pack explodes or ignites.

The vehicle at which the battery pack is mounted, or the battery pack itself, may have various control devices for preventing the overcharge. However, since the battery pack is charged normally when the vehicle is turned off, the control devices may not properly control the vehicle or the battery pack. In addition, the control devices may not adequately cope with an overcharge situation or may not properly recognize the overcharge situation due to an error such as a programming error. Moreover, it is desirable in the viewpoint of safety of the battery pack that the battery pack is protected by multiple protection units as much as possible, rather than as a single protection means, for situations such as overcharge.

DISCLOSURE

Technical Problem

The present disclosure is designed to solve the problems of the related art, and therefore the present disclosure is directed to providing a battery module and a battery pack which may improve the safety by quickly blocking the flow of current in an overcharge situation of the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a first battery group having at least one secondary battery; a second battery group having at least one secondary battery that does not belong to the first battery group; a first bus bar to which an electrode lead of the secondary battery belonging to the first battery group is contacted and coupled; a second bus bar spaced apart from the first bus bar so that an electrode lead of the secondary battery belonging to the second battery group is contacted and coupled thereto; a sub bus bar interposed between the first bus bar and the second bus bar to electrically connect the first bus bar and the second bus bar, the sub bus bar being respectively joined to the first bus bar and the second bus bar by means of soldering; and an elastic member having a portion coupled and fixed to the sub bus bar to give a restoring force for separating the sub bus bar from the first bus bar and the second bus bar.

Here, the elastic member may include a spring.

In addition, the battery module according to the present disclosure may further comprise a frame member at which the first bus bar and the second bus bar are placed and fixed, wherein another portion of the elastic member is coupled and fixed to the frame member.

In addition, both ends of the elastic member may be coupled and fixed to an upper portion of the frame member and a lower portion of the sub bus bar and kept in a compressed state to give a restoring force in an upper direction.

In addition, the frame member may include a guide rib into which the sub bus bar is at least partially inserted, so that the guide rib guides movement of the sub bus bar in a deviating direction.

In addition, the guide rib may be respectively provided at both ends of the sub bus bar.

In addition, the sub bus bar may be configured to elongate in a direction orthogonal to an arrangement direction of the first bus bar and the second bus bar, and both side surfaces of the sub bus bar may be soldered along a length direction.

In addition, the elastic member may be provided in plural along the length direction of the sub bus bar.

In addition, at least one of the first bus bar and the second bus bar may have a groove formed at a portion in contact with the sub bus bar to be concave downwards, so that a soldering material is inserted into the groove.

In addition, the sub bus bar may have a groove formed in a side surface in contact with at least one of the first bus bar and the second bus bar to be concave downwards, so that a soldering material is inserted into the groove.

In addition, the electrode lead contacted and coupled to the first bus bar and the electrode lead contacted and coupled to the second bus bar may have different polarities.

In another aspect of the present disclosure, there is also provided a battery pack, comprising the battery module of the present disclosure.

Advantageous Effects

According to the present disclosure, the safety of a battery module may be improved.

In particular, according to one embodiment of the present disclosure, when an overcharge situation occurs in the battery pack, the electrical connection among a plurality of battery groups included in the battery module may be quickly interrupted.

Accordingly, the overcharge situation may be quickly solved, and it is possible to prevent the battery module from being damaged or ignited due to the overcharge or overcurrent.

Further, if the battery module is used for an electric vehicle, a high voltage and a high current may be applied when charging the battery module, which may result in overcharge to increase the damage thereof. However, in the present disclosure, if overcharge occurs, the electrical connection is interrupted so that the damage is not generated.

In addition, according to one embodiment of the present disclosure, even though various control devices provided at a vehicle or a battery pack to prevent overcharge do not properly operate, the charging current is physically interrupted to further improve the safety of the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
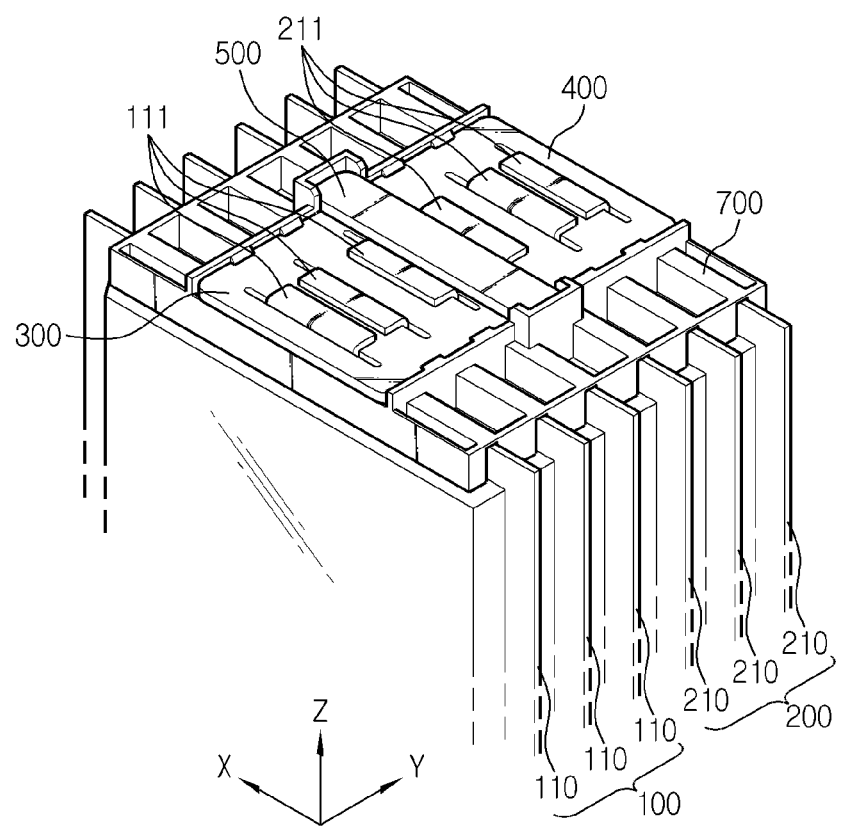
FIG. 1 is a perspective view schematically showing a partial configuration of a battery module according to an embodiment of the present disclosure.

FIG. 1 is a perspective view schematically showing a partial configuration of a battery module according to an embodiment of the present disclosure.

Referring to FIG. 1, a battery module according to the present disclosure may include a first battery group 100, a second battery group 200, a first bus bar 300, a second bus bar 400 and a sub bus bar 500.

The first battery group 100 may include at least one secondary battery 110. For example, as shown in FIG. 1, the first battery group 100 may include three secondary batteries 110.

In addition, the second battery group 200 may include at least one secondary battery 210, besides the above secondary battery. That is, the second battery group 200 may include at least one secondary battery that does not belong to the first battery group 100. For example, as shown in FIG. 1, the second battery group 200 may also include three secondary batteries 210. If the battery module includes only the first battery group 100 and the second battery group 200, the battery module may include six secondary batteries in total.

Hereinafter, for convenience of explanation, the secondary battery 110 belonging to the first battery group 100 is referred to as a first secondary battery, and the secondary battery 210 belonging to the second battery group 200 is referred to as a second secondary battery.

Here, the first secondary battery 110 and the second secondary battery 210 may be pouch-type secondary batteries. That is, the secondary battery may be configured such that an electrode assembly and an electrolyte are accommodated in a pouch exterior having a metal layer interposed between polymer layers, namely an aluminum laminate structure.

If the plurality of pouch-type secondary batteries are provided in the first battery group 100 and the second battery group 200, the secondary batteries 110, 210 may be stacked in one direction. For example, as shown in FIG. 1, the first secondary battery 110 and the second secondary battery 210 may be configured to be stacked in a front and rear direction (Y-axis direction) in a state of standing in an up and down direction (Z-axis direction). In this case, the secondary batteries 110, 210 may be arranged so that their large surfaces face each other. In other words, the secondary battery may be configured so that two large surfaces where the electrode assembly is accommodated are located in the front and rear direction (Y-axis direction).

In the secondary batteries 110, 210 configured to stand in the up and down direction as described above, an electrode lead of each secondary battery may be located at an upper portion and/or a lower portion thereof. For example, as shown in FIG. 1, each secondary battery may be configured so that one electrode lead 111, 211 may be located at the upper portion to protrude upward, and another one electrode lead (not shown) may be located at the lower portion to protrude downward.

Figure 2:
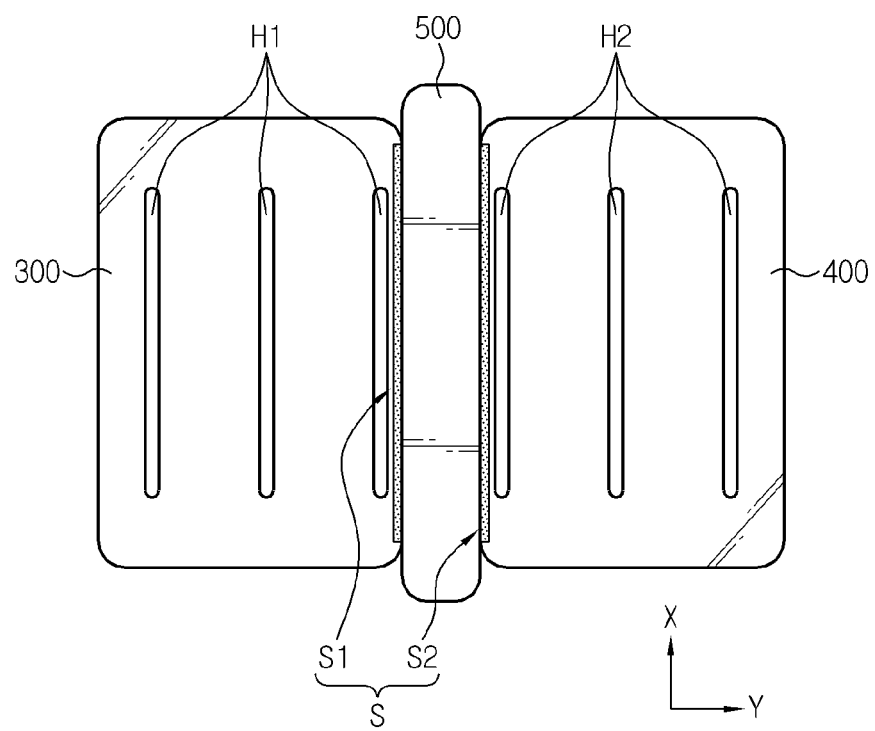
FIG. 2 is a plane view showing only a first bus bar, a second bus bar and a sub bus bar in the configuration of FIG. 1.

FIG. 2 is a plane view showing only a first bus bar 300, a second bus bar 400 and a sub bus bar 500 in the configuration of FIG. 1.

Referring to FIGS. 1 and 2, the first bus bar 300 may be configured to be contacted and coupled to the electrode lead 111 of the secondary battery belonging to the first battery group 100, namely the first secondary battery 110.

For example, the electrode lead 111 of the first secondary battery 110 may be contacted to the first bus bar 300 in such a manner that the electrode lead 111 is bent at a substantially right angle after passing through the first bus bar 300 in an upper direction (Z-axis direction) to contact the upper surface of the first bus bar 300. In this case, a hole may be formed in the first bus bar 300 as indicated by H1 in FIG. 2. In addition, the electrode lead 111 of the first secondary battery may be inserted into the hole H1.

The second bus bar 400 may be configured so that the electrode lead 211 of the secondary battery belonging to the second battery group 200, namely the second secondary battery 210, is contacted and coupled thereto.

For example, the electrode lead 211 of the second secondary battery 210 may be contacted to the second bus bar 400 in such a manner that the electrode lead 211 is bent after passing through the second bus bar 400 in an upper direction (Z-axis direction) to contact the upper surface of the second bus bar 400. In this case, a hole may be formed in the second bus bar 400 as indicated by H2 in FIG. 2. In addition, the electrode lead 211 of the second secondary battery may be inserted into the hole H2.

In addition, the electrode lead 111 of the first secondary battery and the electrode lead 211 of the second secondary battery may be welded to the first bus bar 300 and the second bus bar 400, respectively, or to the first bus bar 300 or second bus bar 400, to secure the fixing force.

The first bus bar 300 and the second bus bar 400 may be made of electrically conductive materials because they are used for electrically connecting the electrode leads. For example, the first bus bar 300 and the second bus bar 400 may be made of metal such as copper, aluminum and steel.

The second bus bar 400 may be spaced a predetermined distance from the first bus bar 300. For example, as shown in the figures, the second bus bar 400 may be configured to be spaced a predetermined distance from the first bus bar 300 in the Y-axis direction.

The sub bus bar 500 is interposed between the first bus bar 300 and the second bus bar 400. Also, the sub bus bar 500 may electrically connect the first bus bar 300 and the second bus bar 400 to each other.

In addition, the sub bus bar 500 is partially bonded to the first bus bar 300 and the second bus bar 400, respectively, to give stability to the electrical connection between the first bus bar 300 and the second bus bar 400. In particular, the sub bus bar 500 may be joined to the first bus bar 300 and the second bus bar 400 by means of soldering.

For example, as shown in FIG. 2, the first bus bar 300 and the second bus bar 400 may be located at a left side and a right side of the sub bus bar 500, respectively. In addition, as shown in FIG. 2, soldering portions S may be provided at left and right sides of the sub bus bar 500, respectively. As the left side portion of the sub bus bar 500 is soldered to the first bus bar 300 and the right side portion of the sub bus bar 500 is soldered to the second bus bar 400 as described above, the sub bus bar 500 and the first bus bar 300, as well as the sub bus bar 500 and the second bus bar 400, may be coupled and fixed to each other.

Meanwhile, in the sub bus bar 500, a portion joined to the first bus bar 300 and the second bus bar 400 may be a side surface of the sub bus bar 500 or a bottom surface of the sub bus bar 500.

Since the sub bus bar 500 is used for forming an electrical path between the first bus bar 300 and the second bus bar 400, the sub bus bar 500 may be made of an electrically conductive material, similar to the first bus bar 300 and the second bus bar 400. For example, the sub bus bar 500 may be made of a metal such as copper, aluminum or steel.

In addition, an electric current may flow between the sub bus bar 500 and the first bus bar 300 through a portion S1 (a first soldering portion) of the sub bus bar 500 soldered to the first bus bar 300 and between the sub bus bar 500 and the second bus bar 400 through a portion S2 (a second soldering portion) soldered to the second bus bar 400. For example, in the configuration of FIG. 2, the sub bus bar 500 may be joined and electrically connected to the first bus bar 300 through the first soldering portion S1 at the left side. In addition, the sub bus bar 500 may be joined and electrically connected to the second bus bar 400 through the second soldering portion S2 at the right side. At this time, the sub bus bar 500 and the first bus bar 300, as well as the sub bus bar 500 and the second bus bar 400, may be electrically connected to each other only through the soldering portions. In this case, the electrical connection between the sub bus bar 500 and the first bus bar 300 and between the sub bus bar 500 and the second bus bar 400 may be interrupted by melting down the soldering portion. However, the sub bus bar 500 and the first bus bar 300, as well as the sub bus bar 500 and the second bus bar 400, may also be electrically connected to each other through a portion other than the soldering portions.

The soldering portion may have a melting point within a predetermined temperature range. For example, the soldering portion may be configured to have a melting point of 100° C. to 300° C. Moreover, the soldering portion may have a melting point of 120° C. to 180° C. The soldering portion may be configured to have a melting point suitable for the specific specification of the battery module, such as the magnitude of electric current in a normal state and characteristics in an overcharge situation. In addition, the soldering portion may include one or more kinds of metals. As the material of the soldering portion, various soldering materials known in the art at the time of filing of this application may be employed.

In addition, the battery module according to the present disclosure may include an elastic member.

Figure 3:
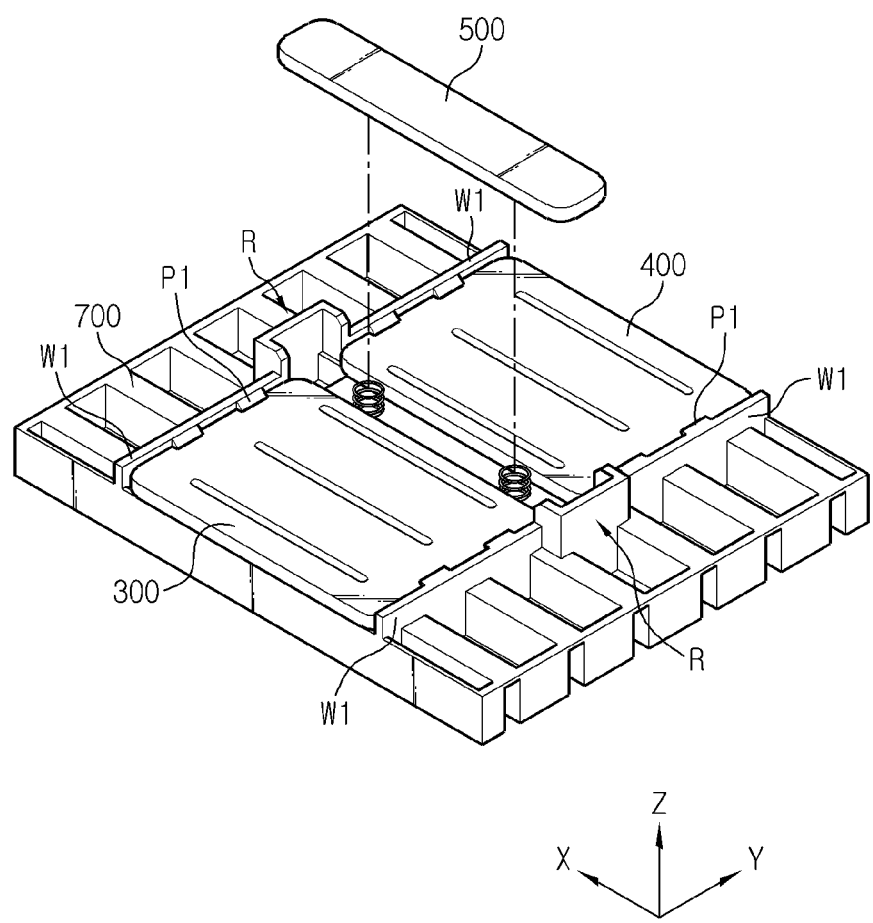
FIG. 3 is a perspective view showing the battery module of FIG. 1 from which some components are separated.

FIG. 3 is a perspective view showing the battery module of FIG. 1 from which some components are separated.

Referring to FIG. 3, the battery module according to the present disclosure may further include an elastic member 600 in addition to the first bus bar 300, the second bus bar 400 and the sub bus bar 500.

The elastic member 600 is a component having elasticity and may be partly coupled and fixed to the sub bus bar 500.

In addition, the elastic member 600 may be configured to have a restoring force such that the sub bus bar 500 is separated from the first bus bar 300 and the second bus bar 400. The sub bus bar 500 is fixed to the first bus bar 300 and the second bus bar 400 through the soldering portion. Here, if the bonding force of the soldering portion is released or weakened to be lower than the elastic force of the elastic member 600, the elastic member 600 may physically separate the sub bus bar 500 from the first bus bar 300 and the second bus bar 400.

In particular, if a specific situation such as overcharge occurs, heat higher than a normal temperature may be applied to the soldering portion between the sub bus bar 500 and the first bus bar 300 and the soldering portion between the sub bus bar 500 and the second bus bar 400. For example, in an overcharge situation or the like, a current having a magnitude higher than the normal current may flow in the electric path passing through the first bus bar 300, the sub bus bar 500 and the second bus bar 400, so that heat higher than a normal temperature is applied to the soldering portion. In this case, if the temperature of the soldering portion rises above the melting point, the soldering portion may be melted entirely or partially. In addition, as the soldering portion is melted, the bonding force of the soldering portion may be weakened or released. Thus, the sub bus bar 500 and the first bus bar 300 coupled and fixed by the soldering portion and/or the sub bus bar 500 and the second bus bar 400 coupled and fixed by the soldering portion may come to a detachable state. At this time, the elastic member 600, which has elastic energy in a deformed state, gives the restoring force to return to its original shape, so that the sub bus bar 500 and the first bus bar 300, as well as the sub bus bar 500 and the second bus bar 400, may be separated from each other. Thus, the electrical connection between the first bus bar 300 and the second bus bar 400 may be interrupted.

Preferably, the elastic member 600 may have a spring. For example, the elastic member 600 may be configured in the form of a coil spring. In this case, one end of the coil spring may be coupled to the sub bus bar 500.

In a normal state, the coil spring, namely the elastic member 600, may be provided to the battery module in a state of possessing elastic energy. For example, the coil spring serving as the elastic member 600 may be provided to the battery module in a compressed or stretched state, compared to its original state, in a normal case. In addition, if the coupling force between the sub bus bar 500 and the other bus bars (the first bus bar 300 and the second bus bar 400) is weakened as the soldering portion melts, the elastic member 600 may return to its original shape, 500 so that the sub bus bar 500 coupled to one end thereof is moved. In addition, due to the movement, the sub bus bar 500 may be separated from the first bus bar 300 and the second bus bar 400.

The elastic member 600 may have various shapes or materials capable of retaining elasticity. For example, the elastic member 600 may be made of a metal such as iron. In addition, the elastic member 600 may be configured in the form of a coil spring as described above or in the form of a leaf spring.

Also preferably, the battery module according to the present disclosure may further include a frame member 700. The frame member 700 will be described additionally with reference to FIG. 4.

Figure 4:
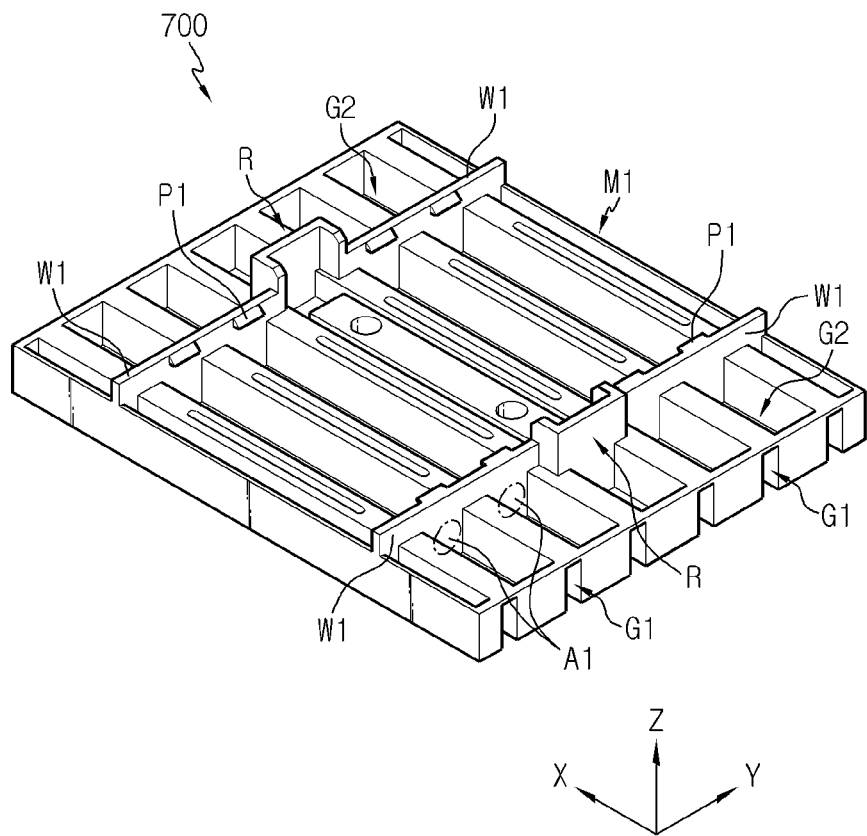
FIG. 4 is a perspective view showing the battery module of FIG. 3 from which only a frame member is separated.

FIG. 4 is a perspective view showing the battery module of FIG. 3 from which only a frame member 700 is separated.

Referring to FIG. 3, the first bus bar 300 and the second bus bar 400 may be placed on the frame member 700. In addition, the frame member 700 may fix the first bus bar 300 and the second bus bar 400 to stably maintain the coupled state of the first bus bar 300, the second bus bar 400 and the frame member 700.

For example, the frame member 700 may include a barrier provided at an upper surface thereof to stand in an upper direction as indicated by W1 shown in FIGS. 3 and 4. The barrier W1 may be elongated in one direction along the upper surface of the frame member 700. For example, in the configuration of FIGS. 3 and 4, the barrier W1 may be configured to stand in the Z-axis direction on the upper surface of the frame member 700 formed substantially along an XY plane. In addition, the barrier may be configured to extend along the Y-axis direction at an upper portion of the frame member 700.

The frame member 700 may have a plurality of barriers. For example, the frame member 700 may have four barriers as shown in FIGS. 3 and 4. In addition, two barriers may be paired to form a placing portion on which the first bus bar 300 or the second bus bar 400 may be placed. For example, in the configuration of FIG. 4, two barriers spaced apart by a predetermined distance in the X-axis direction may be paired to form a placing portion indicated by M1 so that the first bus bar 300 or the second bus bar 400 is placed thereon.

Meanwhile, the first bus bar 300 and the second bus bar 400 may be coupled and fixed to the frame member 700.

For example, as indicated by P1 in FIGS. 3 and 4, the frame member 700 may have a protrusion that protrudes in the horizontal direction toward the first bus bar 300 or the second bus bar 400. In particular, the protrusion P1 may be formed to protrude inward from an inner surface of the barrier W1, namely a side where the first bus bar 300 or the second bus bar 400 is placed. Accordingly, if the first bus bar 300 and the second bus bar 400 are placed between the barriers of the frame member 700, the protrusion P1 is located at an upper portion of the first bus bar 300 and the second bus bar 400, thereby improving the fixation among the first and second bus bars 300, 400 and the frame member 700. Moreover, this protrusion P1 may prevent the first bus bar 300 and the second bus bar 400 from deviating upward from the frame member 700.

In addition, the frame member 700 may be coupled and fixed to another portion of the elastic member 600. That is, the elastic member 600 may be configured such that a portion thereof is coupled to the sub bus bar 500 as described above, and a portion other than the portion coupled to the sub bus bar 500 may be coupled to the frame member 700. For example, an upper end of the elastic member 600 may be coupled and fixed to the sub bus bar 500. In addition, as shown in FIG. 3, a lower portion of the elastic member 600 may be coupled and fixed to the frame member 700.

The frame member 700 has a generally plate shape and may be mounted to a side of each secondary battery included in the battery module where the electrode lead protrudes. For example, as shown in FIG. 1, the frame member 700 may be mounted to an upper portion (a top end in the Z-axis direction) of the first battery module and the second battery module.

The frame member 700 may be made of an electrically insulating material to ensure electrical insulation with electrode leads and bus bars (a first bus bar 300, a second bus bar 400 and a sub bus bar 500). For example, the frame member 700 may be made of a polymer material such as a plastic material.

Referring to FIGS. 3 and 4, the frame member 700 may have an uneven portion at an upper and/or lower portion thereof.

For example, as indicated by G1 in FIG. 4, the frame member 700 may have a groove formed at a lower surface thereof to be is concave upwards. In particular, the lower groove G1 may be configured such that at least a portion of a sealing portion of the secondary battery may be inserted therein. That is, the secondary battery included in the battery module may have a sealing portion formed at a side where the electrode lead protrudes and fused between pouch exteriors, and at least a part of the sealing portion may be inserted into the lower groove G1 of the frame member 700.

Further, the frame member 700 may be configured such that the sealing portions of both the first secondary battery 110 and the second secondary battery 210 are inserted therein. For example, if the battery module includes six secondary batteries in total, including a first secondary battery and a second secondary battery, the frame member 700 may be configured to have six lower grooves G1 as shown in FIG. 4. Thus, the upper sealing portions of both the first secondary battery and the second secondary battery included in the battery module may be inserted into the lower grooves of the frame member 700.

In this configuration of the present disclosure, the coupling between the secondary battery included in the first battery group 100 and the second battery group 200 and the frame member 700 may be improved. That is, as the sealing portion of the secondary battery is inserted into the lower groove of the frame member 700, it is possible to restrict the movement of the secondary battery and the movement of the frame member 700. In addition, in this case, it is possible to reduce the volume of the battery module or improve the energy density of the battery module by disposing the secondary battery closer to the frame member 700.

In addition, as indicated by G2 in FIG. 4, the frame member 700 may have a groove formed at an upper surface thereof to be concave downwards. In particular, the upper groove G2 may be formed at a portion other than the portion where the lower groove G1 is formed therebetween. That is, in FIG. 4, in the Y-axis direction, the upper groove G2 and the lower groove G1 may be arranged alternately.

In this configuration of the present disclosure, it is possible to improve the rigidity of the frame member 700 and reduce the weight thereof.

Meanwhile, if the upper groove G2 is formed at the upper surface of the frame member 700, the barrier W1 of the frame member 700 may be configured to completely block the upper groove G2. That is, as indicated by A1 in FIG. 4, the barrier W1 may be configured to entirely the upper groove G2 from the top to the bottom thereof. In this case, on the basis of the barrier W1, the air flow between the placing portion M1 where the first bus bar 300 and the second bus bar 400 are placed and the outer portion may be blocked. In particular, when the first bus bar 300 and the second bus bar 400 are placed on the inner portion of the barrier W1, namely the placing portion M1, the air and heat located below the first bus bar 300 and the second bus bar 400 may be blocked not to move outwards.

Thus, according to this configuration of the present disclosure, if a lot of heat is generated at the electrode lead, the first bus bar 300 or the second bus bar 400, the discharge of heat is blocked by the barrier, and thus the soldering portion of the sub bus bar 500 may be quickly melted. Thus, in this case, the electrical connection between the first bus bar 300 and the second bus bar 400 may be quickly interrupted.

In the configuration in which the battery module includes the frame member 700 as described above, the elastic member 600 may be coupled and fixed to both ends to the frame member 700 and the sub bus bar 500.

Figure 5:
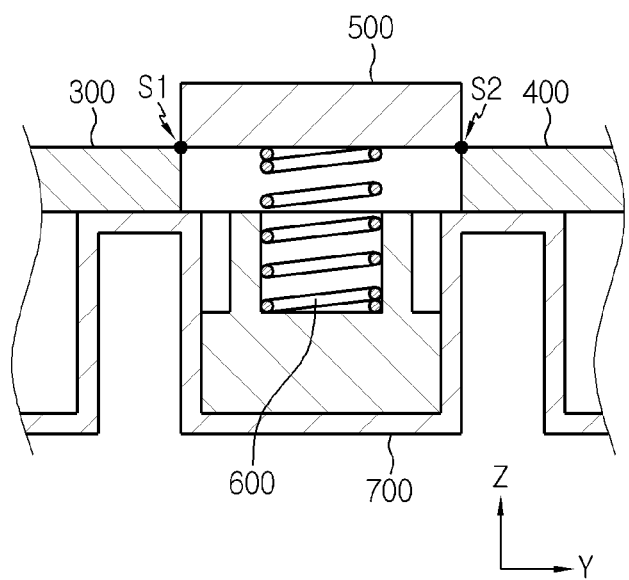
FIG. 5 is a cross-sectioned view schematically showing an elastic member coupled to the frame member and the sub bus bar according to an embodiment of the present disclosure.

FIG. 5 is a cross-sectioned view schematically showing an elastic member 600 coupled to the frame member 700 and the sub bus bar 500 according to an embodiment of the present disclosure.

Referring to FIG. 5, the elastic member 600 may be positioned at the upper portion of the frame member 700 and the lower portion of the sub bus bar 500, so that the lower end of the elastic member 600 is coupled and coupled to the upper portion of the frame member 700 and the upper end of the elastic member 600 is coupled and coupled to the lower portion of the sub bus bar 500.

Here, the elastic member 600 and the frame member 700, as well as the elastic member 600 and the sub bus bar 500, may be coupled in various ways. For example, the elastic member 600 may be coupled to the sub bus bar 500 and/or the frame member 700 in such a manner of being inserted into the sub bus bar 500 and/or the frame member 700. Alternatively, the elastic member 600 may be coupled to the sub bus bar 500 and/or the frame member 700 by means of welding or bolting.

Meanwhile, a left side of the sub bus bar 500 may be bonded to the first bus bar 300 by the first soldering portion S1, and a right side of the sub bus bar 500 may be bonded to the second bus bar 400 by the second soldering portion S2. In addition, by means of the soldering, the electrical path passing through the first bus bar 300, the sub bus bar 500 and the second bus bar 400 may be maintained.

In the configuration in which the first bus bar 300, the sub bus bar 500 and the second bus bar 400 are contacted and connected to each other by means of the soldering portions, the elastic member 600 may be kept in a compressed state. For example, if the elastic member 600 is configured in a coil form, the coil may be compressed to have a shorter length than the original state. In this case, the elastic member 600 may be regarded as having elastic energy to form a restoring force in an upper direction.

Figure 6:
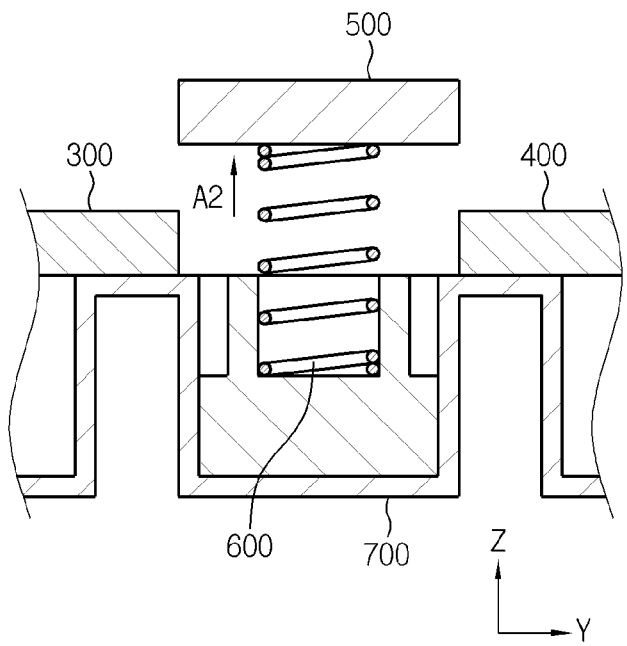
FIG. 6 is a cross-sectioned view schematically showing the configuration of FIG. 5, in which the sub bus bar is separated from the first bus bar and the second bus bar due to the restoring force of the elastic member.

FIG. 6 is a cross-sectioned view schematically showing the configuration of FIG. 5, in which the sub bus bar 500 is separated from the first bus bar 300 and the second bus bar 400 due to the restoring force of the elastic member 600.

If an overcharge situation or the like occurs so that the temperature of the first soldering portion S1 and the second soldering portion S2 rises, the coupling force of the first soldering portion S1 and/or the second soldering portion S2 may become weakened than the restoring force of the elastic member (the spring) that gives a pressure upwards. In this case, the elastic member 600 may return from the compressed state as shown in FIG. 5 to the original state as shown in FIG. 6 by means of the restoring force. That is, the compressed spring as shown in FIG. 5 may be restored to their original shape so that the top and bottom thereof are moved away from each other as shown in FIG. 6, due to the melting of the soldering portion S.

Thus, the sub bus bar 500 coupled to the top of the spring moves upwards as indicated by A2 in FIG. 6, and thus the sub bus bar 500 may be deviated from the first bus bar 300 and the second bus bar 400 to release the connected state between them.

Also preferably, the frame member 700 may include is a guide rib as indicated by R in FIGS. 3 and 4.

At least a portion of the sub bus bar 500 may be inserted into the guide rib R so that the guide rib R guides the movement of the sub bus bar 500 in a deviating direction. That is, when the sub bus bar 500 is separated from the first bus bar 300 and the second bus bar 400 due to the weakening of the soldering portion, the guide rib R may guide the separating direction of the sub bus bar 500.

In this configuration of the present disclosure, when the bonding force of the soldering portion is weakened in an overcharge situation or the like, the sub bus bar 500 may be stably separated from the first bus bar 300 and the second bus bar 400. Thus, even though the bonding force of the soldering portion is weakened due to overcharge or the like, it is possible to prevent that the sub bus bar 500 is not be completely separated from the first bus bar 300 and the second bus bar 400 but maintain its connection state.

Here, the guide rib R may be provided at both ends of the sub bus bar 500. For example, as shown in FIG. 3, the guide ribs R may be positioned at both ends of the sub bus bar 500 in the X-axis direction.

According to this configuration of the present disclosure, when the sub bus bar 500 is moved by the elastic force of the elastic member 600, the guide rib R guides both ends of the sub-bus bar 500, so that the sub bus bar 500 may be entirely deviated from the first bus bar 300 and the second bus bar 400. In addition, it is also possible to prevent just one end of the sub bus bar 500 from being in contact with the first bus bar 300 and the second bus bar 400.

In addition, the guide ribs R may be formed to have grooves in the horizontal direction. In particular, the guide ribs R may have a concave shape to wrap both ends of the sub bus bar 500. That is, both ends of the sub bus bar 500 may be inserted into the grooves of the guide ribs.

For example, as shown in FIGS. 3 and 4, the guide rib R may have a concave shape outwards from the inner side where the sub bus bar 500 is located. More specifically, in the configuration of FIGS. 3 and 4, when the X-axis direction is regarded as a left and right direction, two guide ribs may be disposed to be spaced apart by at a predetermined distance in the left and right direction. In addition, the sub bus bar 500 may be interposed between the two guide ribs. In this case, the left guide rib may be formed to be concave outwards, namely in a left direction. Also, the right guide rib may be formed to be concave outwards, namely in a right direction. It may be regarded that the guide rib has a shape where the guide rib extends approximately in the Y-axis direction on the XY plane and then both ends thereof are bent in the X-axis direction.

According to this configuration of the present disclosure, the horizontal movement of the sub bus bar 500 is restricted by the guide ribs, so that the deviating direction of the sub bus bar 500 may be reliably guided. That is, in the configuration of FIG. 3, the movement of the sub bus bar 500 in the X-axis direction may be restricted by means of the portion of the guide rib extending in the Y-axis direction. In addition, in the configuration of FIG. 3, the movement of the sub bus bar 500 in the Y-axis direction may be restricted by means of the bent portion of the guide rib in the X-axis direction. Thus, the movement of the sub bus bar 500 in both the X-axis direction and the Y-axis direction may be restricted, and the sub bus bar 500 may be allowed to move only in the Z-axis direction, namely in the deviating direction, thereby guiding the sub bus bar 500 to be smoothly deviated in a predetermined direction.

In addition, a surface of the guide rib, which faces the sub bus bar 500, may be formed flat in the up and down direction.

Figure 7:
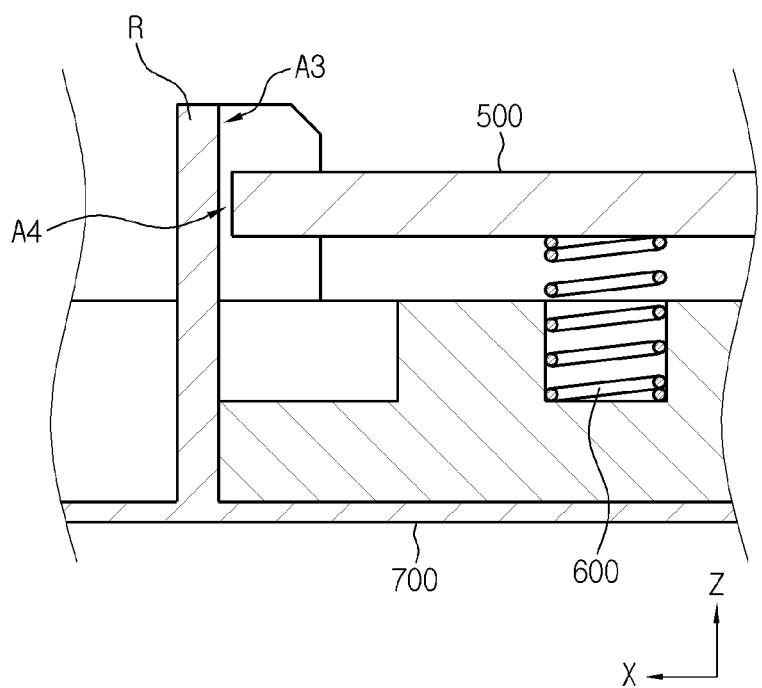
FIG. 7 is a cross-sectioned view schematically showing a guide rib and a sub bus bar of the frame member according to an embodiment of the present disclosure.

FIG. 7 is a cross-sectioned view schematically showing a guide rib and a sub bus bar 500 of the frame member 700 according to an embodiment of the present disclosure.

Referring to FIG. 7, as indicated by A3, the inner surface of the guide rib opposite the sub bus bar 500 (the right side of the guide rib in the drawing) may be configured to stand perpendicularly to the ground or the plane (the XY plane) of the frame member 700, namely in the Z-axis direction. In addition, at this time, the inner surface A3 of the guide rib may be formed in a flat shape. In this case, the end surface (the surface indicated by A4) of the sub bus bar 500 opposite to the inner surface of this guide rib may also be configured to be flat in the up and down direction corresponding to the inner surface A3 of the guide rib.

According to this configuration of the present disclosure, the sub bus bar 500 is ensured to smoothly move in the up and down direction within the guide rib, so that the sub bus bar 500 may be easily deviated when the soldering portion melts.

In particular, according to this configuration of the present disclosure, it is possible to prevent that the sub bus bar 500 is not properly deviated but tilted in the up and down direction when the soldering portion melts.

Figure 8:
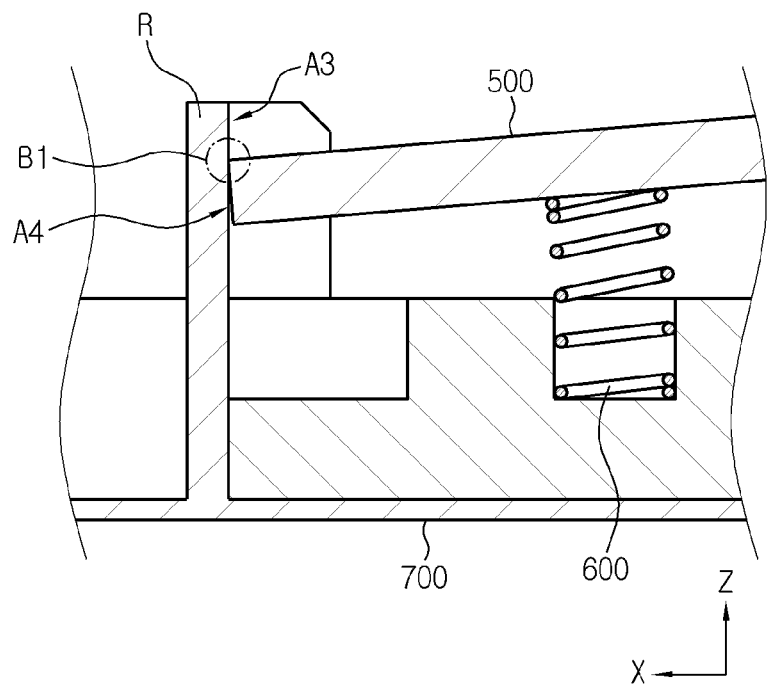
FIG. 8 is a cross-sectioned view schematically showing the configuration of FIG. 7, in which the sub bus bar is prevented from being tilted due to the guide rib.

FIG. 8 is a cross-sectioned view schematically showing the configuration of FIG. 7, in which the sub bus bar 500 is prevented from being tilted due to the guide rib.

Referring to FIG. 8, due to irregular melting of the soldering portion or irregular restoring force of the elastic member 600, the sub bus bar 500 may tend to be tilted without maintaining a horizontal state. However, according to the configuration, as indicated by B 1, a top of a left end of the sub bus bar 500 comes into contact with the inner surface of the guide rib to prevent the sub bus bar 500 from being further tilted. Accordingly, it is possible to prevent that the electrical connection between the first bus bar 300 and the second bus bar 400 is not properly interrupted due to incomplete deviation of the sub bus bar 500.

The sub bus bar 500 may be configured to elongate in one direction. For example, the sub bus bar 500 may be configured in the form of a long bar extending in the horizontal direction.

In particular, the sub bus bar 500 may be configured to elongate in a direction orthogonal to an arrangement direction of the first bus bar 300 and the second bus bar 400. For example, seeing the configuration of FIG. 2, when the first bus bar 300 and the second bus bar 400 are arranged to be spaced apart from each other by a predetermined distance in the Y-axis direction, the sub bus bar 500 may be arranged to elongate in a horizontal direction orthogonal to the arrangement direction, namely in the X-axis direction.

In the configuration where the sub bus bar 500 elongates in one direction, both sides of the sub bus bar 500 may be soldered along a length direction. For example, in the configuration of FIG. 2, when the sub bus bar 500 is configured to elongate in the X-axis direction, left and right side portions of the sub bus bar 500 indicated by S1 and S2 may be soldered to the first bus bar 300 and the second bus bar 400. In this case, the soldering portions may be formed to elongate along the length direction of the sub bus bar 500. For example, as shown in FIG. 2, the soldering portions of the sub bus bar 500 may be configured to elongate along the X-axis direction.

In the configuration where the shape of the sub bus bar 500 and the soldering form of the sub bus bar 500 are elongated in a direction orthogonal to the arrangement direction of the first bus bar 300 and the second bus bar 400, the electric connection between the first bus bar 300 and the second bus bar 400 by the sub bus bar 500 and the soldering portion may be stably maintained in a normal state. In addition, in this case, the bonding performance between the sub bus bar 500 and the first and second bus bar 300, 400 by the soldering portion may be stably secured. Moreover, in this case, since it is possible to prevent the sub bus bar 500 from becoming excessively large, the sub bus bar 500 may be quickly deviated when an overcharge situation or the like occurs. In addition, in this case, it is not necessary to secure much space for the deviation of the sub bus bar 500.

Also preferably, a plurality of elastic members 600 may be arranged along the length direction of the sub bus bar 500.

For example, seeing FIG. 3, the sub bus bar 500 may be formed to elongate in the X-axis direction. In this case, two elastic members 600, for example two coil springs, may be disposed between the upper portion of the frame member 700 and the lower portion of the sub bus bar 500 to be spaced apart from each other by a predetermined distance along the X-axis direction.

According to this configuration of the present disclosure, as the elastic force by the plurality of elastic members 600 is generated uniformly with respect to the sub bus bar 500, it is possible that the sub bus bar 500 is perfectly and smoothly separated from the first bus bar 300 and the second bus bar 400 when an overcharge situation or the like occurs.

Also preferably, at least one of the first bus bar 300 and the second bus bar 400 may have a concave groove formed at a portion thereof that is in contact with the sub bus bar 500. In addition, in this case, the soldering portion may be formed in the groove. This will be described in more detail with reference to FIG. 9.

Figure 9:
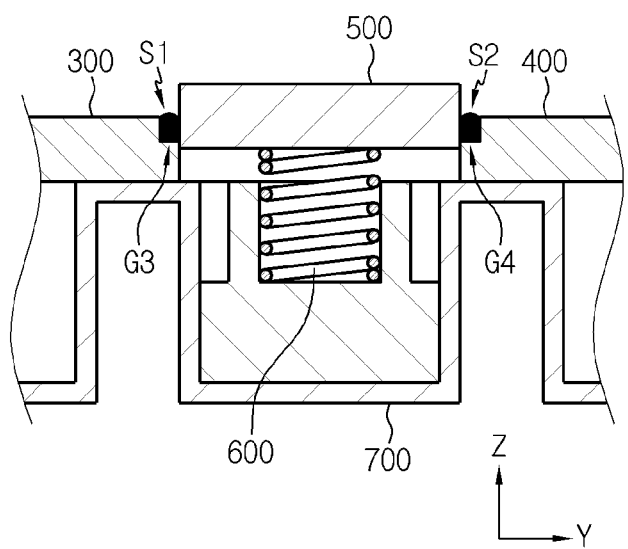
FIG. 9 is a cross-sectioned view schematically showing a partial configuration of a battery module according to another embodiment of the present disclosure.

FIG. 9 is a cross-sectioned view schematically showing a partial configuration of a battery module according to another embodiment of the present disclosure. In FIG. 9, for convenience of explanation, the secondary battery is not depicted. In addition, in this embodiment, any feature that can be identically or similarly explained as in the former embodiment will not be described in detail, but features different therefrom will be described in detail.

Referring to FIG. 9, the first bus bar 300 and the second bus bar 400 may be soldered to the sub bus bar 500. More specifically, the right side portion of the first bus bar 300 may be soldered to the left end of the sub bus bar 500, and the left side portion of the second bus bar 400 may be soldered to the right end of the sub bus bar 500. At this time, as indicated by G3, the first bus bar 300 may have a groove (a soldering groove) formed at the right side portion in contact with the sub bus bar 500 to be concave downwards. In addition, a soldering material may be inserted into the soldering groove G3 to form the soldering portion S1 between the first bus bar 300 and the sub bus bar 500 thereat. In addition, as indicated by G4, the second bus bar 400 may have a soldering groove formed at the left side portion in contact with the sub bus bar 500 to be concave downwards. In addition, a soldering material may be inserted into the soldering groove G4 to form the soldering portion S2 between the second bus bar 400 and the sub bus bar 500 thereat.

In this configuration of the present disclosure, the soldering process between the first bus bar 300 and/or the second bus bar 400 and the sub bus bar 500 may be performed more easily. For example, a soldering joint may be formed by inserting a soldering material along the soldering groove formed in the first bus bar 300 and/or the second bus bar 400 and then heating the soldering material. In addition, since the soldering portion is formed along the soldering grooves of the first bus bar 300 and the second bus bar 400, the position of the soldering portion may be guided. Thus, in this case, the soldering work may be smoothly performed.

Also preferably, the sub bus bar 500 may have a groove formed at a side in contact with at least one of the first bus bar 300 and the second bus bar 400, to be concave downwards. In addition in this case, a soldering portion may be formed in the groove.

Figure 10:
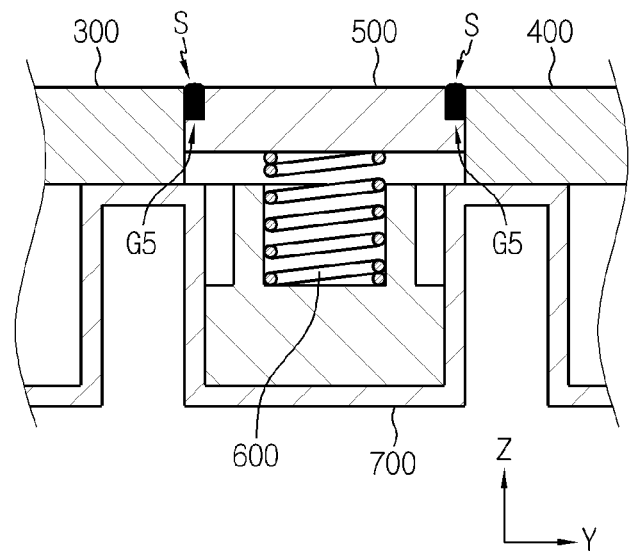
FIG. 10 is a cross-sectioned view schematically showing a partial configuration of a battery module according to still another embodiment of the present disclosure.

FIG. 10 is a cross-sectioned view schematically showing a partial configuration of a battery module according to still another embodiment of the present disclosure. In FIG. 10, for convenience of explanation, the secondary battery is not depicted.

Referring to FIG. 10, as indicated by G5, the sub bus bar 500 may have grooves (soldering grooves) respectively formed at the left side portion in contact with the first bus bar 300 and the right side portion in contact with the second bus bar 400, to be concave downwards. In addition, a soldering material may be inserted into the soldering grooves to form a soldering portion S between the sub bus bar 500 and another bus bar (the first bus bar 300 and/or the second bus bar 400).

In this configuration of the present disclosure, the soldering process between the sub bus bar 500 and the first bus bar 300 and/or the second bus bar 400 may be performed more easily. For example, the soldering portion may be formed by inserting a soldering material along soldering grooves G5 formed at both sides of the sub bus bar 500 and then heating the soldering material. Accordingly, since the soldering portion may be guided by the soldering groove of the sub bus bar 500, the soldering process may be performed more smoothly.

Figure 11:
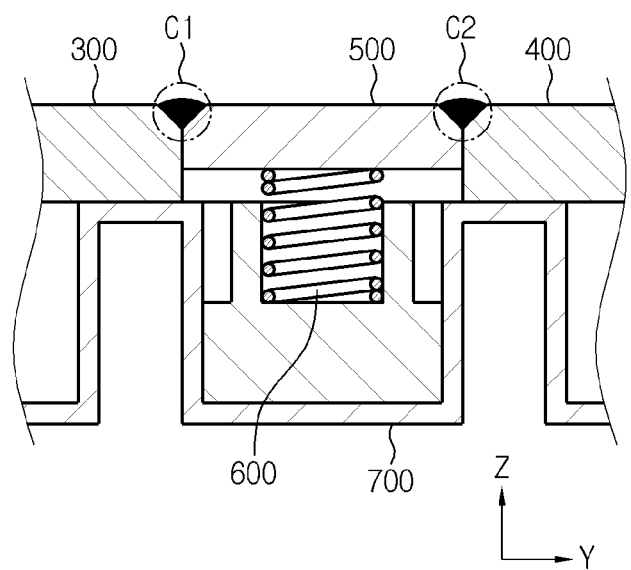
FIG. 11 is a cross-sectioned view schematically showing a partial configuration of a battery module according to still another embodiment of the present disclosure.

FIG. 11 is a cross-sectioned view schematically showing a partial configuration of a battery module according to still another embodiment of the present disclosure.

Referring to FIG. 11, all of the sub bus bar 500, the first bus bar 300 and the second bus bar 400 may have grooves that are concave downwards. In particular, the grooves may be formed in contact with each other.

For example, as indicated by C1, the groove formed at the left side of the sub bus bar 500 may be in contact with the groove formed at the right side of the first bus bar 300 to form a single soldering groove. That is, the groove formed in the sub bus bar 500 and the groove formed in the first bus bar 300 may be connected to form a single soldering groove. In addition, a solder joint may be made between the sub bus bar 500 and the first bus bar 300 by inserting a soldering material into the soldering groove.

In addition, as indicated by C2, the groove formed at the right side of the sub bus bar 500 may be in contact with the groove formed at the left side of the second bus bar 400 to form a single soldering groove. That is, the groove formed in the sub bus bar 500 and the groove formed in the second bus bar 400 may be connected to form a single soldering groove. In addition, a solder joint may be made between the sub bus bar 500 and the second bus bar 400 by inserting a soldering material into the soldering groove.

Further, in this configuration, the soldering groove may be formed such that at least a portion of the soldering groove becomes larger in the upper direction. For example, seeing the portion C1 in FIG. 11, the groove at the top of the right end of the first bus bar 300 may be formed to have a lowered height in the right direction, namely to have a chamfered shape. In addition, along with it, the groove at the top of the left end of the sub bus bar 500, which configures the soldering portion, may be formed to have a lower height in the left direction, namely to have a chamfered shape. In addition, seeing the portion C2 in FIG. 11, the groove at the top of the left end of the second bus bar 400 may be formed to have a lowered height in toward the left direction. In addition, along with it, the groove at the top of the right end of the sub bus bar 500, which configures the soldering portion, may be formed to have a lowered height in the right direction, namely a chamfered shape.

In this configuration of the present disclosure, the sub bus bar 500 may be more quickly and smoothly separated from the first bus bar 300 and the second bus bar 400 in an overcharge situation or the like. That is, when the sub bus bar 500 moves in the upper direction, the soldering material of the soldering portion may be more easily deviated in the upper direction, so that the sub bus bar 500 may be more smoothly deviated. In addition, in this case, the soldering process may be performed more smoothly by reducing the amount of soldering material inserted into the soldering groove.

In the battery module according to the present disclosure, the electrode lead contacted and coupled to the first bus bar 300 and the electrode lead contacted and coupled to the second bus bar 400 may be configured to have different polarities.

For example, seeing the configuration of FIG. 1, the electrode lead of the first secondary battery 110 may be contacted and coupled to the first bus bar 300, and the electrode lead of the second secondary battery may be contacted and coupled to the second bus bar 400. Here, the electrode lead of the first secondary battery in contact with the first bus bar 300 may be a negative electrode lead, and the electrode lead of the second secondary battery in contact with the second bus bar 400 may be a positive electrode lead.

In this case, the secondary batteries in the first battery module may be regarded as being connected in parallel with each other. In addition, the secondary batteries in the second battery module may also be regarded as being connected in parallel with each other. Meanwhile, the first battery module and the second battery module may be regarded as being connected in series. In addition, the sub bus bar 500 may be regarded as connecting the first bus bar 300 and the second bus bar 400 in series.

In this configuration of the present disclosure, when the sub bus bar 500 is deviated from the first bus bar 300 and/or the second bus bar 400, the current flow between the first battery module and the second battery module may be interrupted. Thus, when the sub bus bar 500 is deviated, the serial connection between the first battery module and the second battery module may be completely disconnected.

Thus, in this case, the overall current flow of the battery module is cut off, and thus the charging operation or the like of the battery module is stopped and overcharge is prevented to ensure the safety of the battery module.

A battery pack according to the present disclosure may include at least one battery module of the present disclosure. In addition, the battery pack according to the present disclosure may further include a pack case for accommodating the battery module and various devices for controlling charge/discharge of the battery module such as a battery management system (BMS), a current sensor and a fuse, in addition to the battery module.

The battery module according to the present disclosure may be applied to vehicles such as electric vehicles and hybrid electric vehicles. That is, a vehicle according to the present disclosure may include the battery module of the present disclosure. In particular, in the case of a vehicle that obtains a driving power from a battery, like an electric vehicle, the cooling performance of the battery module is very important. Thus, if the battery module according to the present disclosure is applied to the vehicle, the battery module may ensure stability and safety with effective cooling performance.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: first battery group
200: second battery group
300: first bus bar
400: second bus bar
500: sub bus bar
600: elastic member
700: frame member

What is claimed is:

1. A battery module, comprising:
a first battery group having a secondary battery;
a second battery group having a secondary battery that does not belong to the first battery group;
a first bus bar to which an electrode lead of the secondary battery belonging to the first battery group is contacted and coupled;
a second bus bar spaced apart from the first bus bar so that an electrode lead of the secondary battery belonging to the second battery group is contacted and coupled thereto;
a sub bus bar interposed between the first bus bar and the second bus bar to electrically connect the first bus bar and the second bus bar, the sub bus bar being respectively joined to the first bus bar and the second bus bar with solder; and
an elastic member having a portion coupled and fixed to the sub bus bar to give a restoring force for separating the sub bus bar from the first bus bar and the second bus bar,
wherein the elastic member is kept in a compressed state by the sub bus bar respectively joined to the first bus bar and the second bus bar with the solder.

2. The battery module according to claim 1, wherein the elastic member includes a spring.

3. The battery module according to claim 1, further comprising: a frame member at which the first bus bar and the second bus bar are placed and fixed, wherein another portion of the elastic member is coupled and fixed to the frame member.

4. The battery module according to claim 3, wherein both ends of the elastic member are coupled and fixed to an upper portion of the frame member and a lower portion of the sub bus bar and kept in a compressed state to give a restoring force in an upper direction.

5. The battery module according to claim 3, wherein the frame member includes a guide rib into which the sub bus bar is at least partially inserted, so that the guide rib guides movement of the sub bus bar in a deviating direction.

6. The battery module according to claim 5, wherein the guide rib is respectively provided at both ends of the sub bus bar.

7. The battery module according to claim 1, wherein the sub bus bar is configured to elongate in a direction orthogonal to an arrangement direction of the first bus bar and the second bus bar, and both side surfaces of the sub bus bar are soldered along a length direction.

8. The battery module according to claim 7, wherein the elastic member is provided in plural along the length direction of the sub bus bar.

9. The battery module according to claim 1, wherein at least one of the first bus bar and the second bus bar has a groove formed at a portion in contact with the sub bus bar to be concave downwards, so that a soldering material is inserted into the groove.

10. The battery module according to claim 1, wherein the sub bus bar has a groove formed in a side surface in contact with at least one of the first bus bar and the second bus bar to be concave downwards, so that a soldering material is inserted into the groove.

11. The battery module according to claim 1, wherein the electrode lead contacted and coupled to the first bus bar and the electrode lead contacted and coupled to the second bus bar have different polarities.

12. A battery pack, comprising the battery module defined in claim 1.

13. The battery module according to claim 1, wherein:
the sub bus bar includes a side surface having a groove,
one of the first bus bar and the second bus bar includes a side surface having a groove,
the groove of the sub bus bar is in contact with the groove of the one of the first and second bus bar to form a single groove, and
the solder is in the single groove.

14. The battery module according to claim 13, wherein the groove of the sub bus bar and the groove of the one of the first and second bus bar each has a chamfered shape.

15. A battery module, comprising:
a first battery group having a secondary battery;
a second battery group having a secondary battery that does not belong to the first battery group;
a first bus bar to which an electrode lead of the secondary battery belonging to the first battery group is contacted and coupled;
a second bus bar spaced apart from the first bus bar so that an electrode lead of the secondary battery belonging to the second battery group is contacted and coupled thereto;
a sub bus bar interposed between the first bus bar and the second bus bar to electrically connect the first bus bar and the second bus bar, the sub bus bar being respectively joined to the first bus bar and the second bus bar with solder; and
an elastic member having a portion coupled and fixed to the sub bus bar to give a restoring force for separating the sub bus bar from the first bus bar and the second bus bar,
wherein:
the sub bus bar includes a side surface having a groove,
one of the first bus bar and the second bus bar includes a side surface having a groove,
the groove of the sub bus bar is in contact with the groove of the one of the first and second bus bar to form a single groove, and
the solder is in the single groove.

\* \* \* \* \*